(12) United States Patent
DuBose

(10) Patent No.: US 7,908,498 B2
(45) Date of Patent: *Mar. 15, 2011

(54) PRIMARY SIDE CONTROL CIRCUIT AND METHOD FOR ULTRA-LOW IDLE POWER OPERATION

(75) Inventor: Richard G. DuBose, Scottsdale, AZ (US)

(73) Assignee: iGo, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/834,595

(22) Filed: Jul. 12, 2010

(65) Prior Publication Data

US 2010/0332865 A1     Dec. 30, 2010

Related U.S. Application Data

(63) Continuation of application No. 12/175,343, filed on Jul. 17, 2008, now Pat. No. 7,779,278.

(60) Provisional application No. 61/057,157, filed on May 29, 2008.

(51) Int. Cl.
    *G06F 1/26* (2006.01)

(52) U.S. Cl. ........ 713/300; 713/320; 713/323; 323/271; 323/317

(58) Field of Classification Search .................. 713/300, 713/320, 323; 323/271, 317
    See application file for complete search history.

(56) References Cited

U.S. PATENT DOCUMENTS

| | | |
|---|---|---|
| 3,444,362 A | 5/1969 | Perlman |
| 3,678,416 A | 7/1972 | Burwen |
| 3,753,159 A | 8/1973 | Burwen |
| 4,510,562 A | 4/1985 | Maeba |
| 4,659,979 A | 4/1987 | Burnham |
| 4,675,537 A | 6/1987 | Mione |
| 4,731,549 A | 3/1988 | Hiddelson |
| 4,733,135 A | 3/1988 | Hanlet |
| 4,874,962 A | 10/1989 | Hermans |
| 4,970,623 A | 11/1990 | Pintar |
| 5,014,178 A | 5/1991 | Balakrishnan |
| 5,017,844 A | 5/1991 | Lendaro |
| 5,063,164 A | 11/1991 | Goldstein |
| 5,285,369 A | 2/1994 | Balakrishnan |
| 5,313,381 A | 5/1994 | Balakrishnan |
| 5,414,475 A | 5/1995 | Tryzna et al. |
| 5,455,487 A | 10/1995 | Mix et al. |

(Continued)

FOREIGN PATENT DOCUMENTS

EP     0588173     3/1994

(Continued)

OTHER PUBLICATIONS

Int'l Search Report & Written Opinion for Int'l Application No. PCT/US09/043815 dated Feb. 17, 2010.

(Continued)

*Primary Examiner* — Nitin C Patel
(74) *Attorney, Agent, or Firm* — Snell & Wilmer L. L. P.

(57) ABSTRACT

A method and circuit for reducing power consumption during idle mode to ultra-low levels, such as about $1/10^{th}$ to $1/1000^{th}$ or less of active power is disclosed. An ultra-low idle power supply comprises a primary circuit, a secondary circuit and a control circuit. The control circuit monitors behavior of the primary circuit and determines whether an idle state or no load condition exists, and if so the primary circuit is disengaged. By disengaging the primary circuit, the power consumption of the ultra-low idle power supply is reduced to ultra-low levels.

16 Claims, 4 Drawing Sheets

U.S. PATENT DOCUMENTS

| | | |
|---|---|---|
| 5,457,595 A | 10/1995 | Baldwin |
| 5,481,178 A | 1/1996 | Wilcox et al. |
| 5,541,457 A | 7/1996 | Morrow |
| 5,579,201 A | 11/1996 | Karageozian |
| 5,598,042 A | 1/1997 | Mix et al. |
| 5,615,107 A | 3/1997 | DeAngelis |
| 5,689,407 A | 11/1997 | Marinus et al. |
| 5,699,051 A | 12/1997 | Billig et al. |
| 5,731,694 A | 3/1998 | Wilcox et al. |
| 5,731,947 A | 3/1998 | Hirose |
| RE36,098 E | 2/1999 | Vinciarelli |
| 5,923,103 A | 7/1999 | Pulizzi et al. |
| 5,990,405 A | 11/1999 | Auten et al. |
| 5,994,885 A | 11/1999 | Wilcox et al. |
| 5,995,384 A | 11/1999 | Majid et al. |
| 5,999,417 A | 12/1999 | Schlecht |
| 6,198,637 B1 | 3/2001 | Hosotani et al. |
| 6,212,079 B1 | 4/2001 | Balakrishnan et al. |
| 6,226,190 B1 | 5/2001 | Balakrishnan et al. |
| 6,239,509 B1 | 5/2001 | Rader et al. |
| 6,297,623 B1 | 10/2001 | Balakrishnan et al. |
| 6,304,066 B1 | 10/2001 | Wilcox et al. |
| 6,333,862 B1 | 12/2001 | Lee |
| 6,339,314 B1 | 1/2002 | Bruning |
| 6,396,166 B1 | 5/2002 | Kim |
| 6,411,119 B1 | 6/2002 | Feldtkeller |
| 6,414,863 B1 | 7/2002 | Bayer et al. |
| 6,480,401 B2 | 11/2002 | Tang |
| 6,498,466 B1 | 12/2002 | Edwards |
| 6,501,195 B1 | 12/2002 | Barton |
| 6,509,658 B1 | 1/2003 | Kim |
| 6,519,166 B1 | 2/2003 | Li |
| 6,525,514 B1 | 2/2003 | Balakrishnan et al. |
| 6,528,902 B1 | 3/2003 | Barton |
| 6,529,354 B1 | 3/2003 | Shteynberg et al. |
| 6,580,258 B2 | 6/2003 | Wilcox et al. |
| 6,586,849 B2 | 7/2003 | Tarr |
| 6,661,679 B1 | 12/2003 | Yang et al. |
| 6,670,597 B1 | 12/2003 | Kitamura |
| 6,738,914 B2 | 5/2004 | Christopher |
| 6,754,092 B2 | 6/2004 | McDowell et al. |
| 6,759,762 B2 | 7/2004 | Barton |
| 6,759,763 B2 | 7/2004 | Barton |
| 6,781,356 B1 | 8/2004 | Yang et al. |
| 6,811,444 B2 | 11/2004 | Geyer |
| 6,853,173 B2 | 2/2005 | Caine et al. |
| 6,917,506 B2 | 7/2005 | Chou |
| 6,940,272 B2 | 9/2005 | Niv |
| 6,995,807 B2 | 2/2006 | Libera |
| 7,027,300 B2 | 4/2006 | Lord |
| 7,106,602 B2 | 9/2006 | Mabanta et al. |
| 7,132,763 B2 | 11/2006 | Rendic |
| 7,141,891 B2 | 11/2006 | McNally et al. |
| 7,193,335 B2 | 3/2007 | Palmer et al. |
| 7,272,025 B2 | 9/2007 | Hawley |
| 7,285,874 B2 | 10/2007 | Menas et al. |
| 7,301,319 B2 | 11/2007 | Balakrishnan et al. |
| 7,313,004 B1 | 12/2007 | Yang et al. |
| 7,321,223 B2 | 1/2008 | Hachiya |
| 7,332,834 B2 | 2/2008 | Lee |
| 7,345,462 B2 | 3/2008 | Balakrishnan et al. |
| 7,345,894 B2 | 3/2008 | Sawtell et al. |
| 7,348,766 B2 | 3/2008 | Hachiya et al. |
| 7,369,418 B2 | 5/2008 | Balakrishnan et al. |
| 7,444,530 B2 | 10/2008 | Deppe et al. |
| 7,779,278 B2 | 8/2010 | DuBose |
| 7,795,759 B2 | 9/2010 | DuBose |
| 2002/0135474 A1 | 9/2002 | Sylliassen |
| 2003/0042879 A1 | 3/2003 | Huh et al. |
| 2004/0037019 A1 | 2/2004 | Yokozawa |
| 2004/0070299 A1 | 4/2004 | Cyr |
| 2004/0105285 A1 | 6/2004 | Tanaka et al. |
| 2004/0132407 A1 | 7/2004 | Hein-Magnussen et al. |
| 2004/0257054 A1 | 12/2004 | Balakrishnan |
| 2005/0041360 A1 | 2/2005 | Detteweiler |
| 2005/0099164 A1 | 5/2005 | Yang |
| 2005/0207189 A1 | 9/2005 | Chen |
| 2006/0098462 A1 | 5/2006 | Usui |
| 2006/0271800 A1 | 11/2006 | Li et al. |
| 2006/0273764 A1 | 12/2006 | Huang |
| 2007/0038334 A1 | 2/2007 | Chou |
| 2007/0115696 A1 | 5/2007 | Berghegger |
| 2007/0145946 A1 | 6/2007 | Chiang |
| 2007/0236180 A1 | 10/2007 | Rodgers |
| 2007/0262646 A1 | 11/2007 | Lee |
| 2008/0007240 A1 | 1/2008 | Hawley |
| 2008/0012533 A1 | 1/2008 | Guang et al. |
| 2008/0042622 A1 | 2/2008 | Wong et al. |
| 2008/0049452 A1 | 2/2008 | Van Bodegraven |
| 2008/0106148 A1 | 5/2008 | Gelonese |
| 2008/0261453 A1 | 10/2008 | Chen |
| 2008/0278975 A1 | 11/2008 | Degan |
| 2009/0067201 A1 | 3/2009 | Cai |
| 2009/0121894 A1 | 5/2009 | Wilson et al. |
| 2009/0224603 A1 | 9/2009 | Perper et al. |
| 2009/0235107 A1 | 9/2009 | Gelonese |
| 2009/0295346 A1 | 12/2009 | Matthews |

FOREIGN PATENT DOCUMENTS

| | | |
|---|---|---|
| EP | 1708331 | 4/2007 |
| JP | 201136661 | 5/2001 |
| JP | 2003133009 | 5/2003 |
| KR | 100436114 | 4/2002 |
| KR | 1020020030869 | 4/2004 |
| WO | WO 2005/076416 | 8/2005 |
| WO | 2006062329 | 6/2006 |
| WO | 2006106310 | 10/2006 |
| WO | WO 2006/106310 | 10/2006 |
| WO | 2007027063 | 3/2007 |
| WO | WO 2007/135429 | 11/2007 |
| WO | 2008017877 | 2/2008 |
| WO | WO 2008/037428 | 3/2008 |

OTHER PUBLICATIONS

Int'l Search Report for Int'l Application No. PC/US09/039549 dated Aug. 4, 2009.

Motorola, Inc., MC44603 Datasheet "Mixed Frequency Mode Green Line PWM Controller" 1999, retrieved from http://www.digchip.com/datasheets/parts/datasheet/343/MC44603-pdf.php.

Interview Summary dated Mar. 4, 2010 from U.S. Appl. No. 12/175,343.

Non-Final Office Action dated Mar. 17, 2010 from U.S. Appl. No. 12/175,343.

Interview Summary dated Apr. 13, 2010 from U.S. Appl. No. 12/175,343.

Notice of Allowance dated Jun. 11, 2010 from U.S. Appl. No. 12/175,343.

Interview Summary dated Mar. 4, 2010 from U.S. Appl. No. 12/418,499.

Non-Final Office Action dated Mar. 17, 2010 from U.S. Appl. No. 12/418,499.

Interview Summary dated Apr. 13, 2010 from U.S. Appl. No. 12/418,499.

Final Office Action dated May 14, 2010 from U.S. Appl. No. 12/418,499.

Notice of Allowance dated Jun. 3, 2010 from U.S. Appl. No. 12/418,499.

PCT; International Preliminary Report on Patentability dated Nov. 2, 2010 in Application No. PCT/US2009/039549.

GB; Examination Report dated Oct. 11, 2010 in Application No. GB1012654.8.

GB; Examination Report dated Oct. 12, 2010 in Application No. GB1012659.7.

GB; Examination Report dated Aug. 18, 2010 in Application No. GB1012632.4.

GB; Examination Report dated Aug. 19, 2010 in Application No. GB1012641.5.

GB; Examination Report dated Aug. 19, 2010 in Application No. GB1012645.6.

USPTO; Office Action dated Dec. 2, 2010 in U.S. Appl. No. 12/860,607.

PCT; International Search Report and Written Opinion dated Jan. 20, 2010 in Application No. PCT/US2009/046761.
USPTO; Office Action dated Jun. 16, 2010 in U.S. Appl. No. 12/180,407.
USPTO; Notice of Allowance dated Jul. 28, 2010 in U.S. Appl. No. 12/180,407.
USPTO; Office Action dated Jun. 21, 2010 in U.S. Appl. No. 12/180,410.
USPTO; Notice of Allowance dated Jul. 28, 2010 in U.S. Appl. No. 12/180,410.
USPTO; Office Action dated Jun. 17, 2010 in U.S. Appl. No. 12/180,411.
USPTO; Notice of Allowance dated Aug. 4, 2010 in U.S. Appl. No. 12/180,411.
PCT; International Preliminary Report on Patentability dated Nov. 2, 2010 in Application No. PCT/US2009/043815.

PRIMARY SIDE CONTROL CIRCUIT AND METHOD FOR ULTRA-LOW IDLE POWER OPERATION

CROSS-REFERENCE TO RELATED APPLICATIONS

This application is a continuation of U.S. patent application Ser. No. 12/175,343, filed Jul. 17, 2008, now U.S. Pat. No. 7,779,278, and entitled "PRIMARY SIDE CONTROL CIRCUIT AND METHOD FOR ULTRA-LOW IDLE POWER OPERATION", which claims priority to and benefit of U.S. Provisional Application No. 61/057,157, filed on May 29, 2008, and entitled "PRIMARY SIDE CONTROLLER MONITORING CIRCUIT AND METHOD", all of which are hereby incorporated by reference.

FIELD OF INVENTION

The present invention relates to reducing power consumption in electronic devices. More particularly, the present invention relates to a circuit and method for initiating an ultra-low idle power mode in a power supply or device.

BACKGROUND OF THE INVENTION

The increasing demand for lower power consumption and environmentally friendly consumer devices has resulted in interest in power supply circuits with "green" technology. For example, on average, a notebook power adapter continuously "plugged in" spends 67% of its time in idle mode. Even with a power adapter which conforms to the regulatory requirements of dissipating less then 0.5 watts/hour, this extended idle time adds up to 3000 watt-hours of wasted energy each year per adapter. When calculating the wasted energy of the numerous idle power adapters, the power lost is considerable.

SUMMARY OF THE INVENTION

In accordance with various aspects of the present invention, a method and circuit for reducing power consumption during idle mode of a powered device to ultra-low levels, such as approximately $1/10^{th}$ to $1/1000^{th}$ or less of active power is disclosed. In an exemplary embodiment, an ultra-low idle power supply provides power to an electronic device, such as for example, a notebook computer, mobile phones, Bluetooth headsets, smartphones, MP3 players, and portable GPS systems. An ultra-low idle power supply may include a primary circuit, a secondary circuit, and a control circuit. The secondary circuit is coupled with the primary circuit, such as through an isolation device. The primary circuit receives control signals from the control circuit to suitably control the state of the primary circuit.

In an exemplary embodiment, the control circuit comprises a logic control unit than monitors and assesses whether the powered device is in an idle mode, and if so, will provide a control signal that is configured to control the state of the primary circuit by controlling a switching circuit to alter the primary circuit state. By disengaging and/or disabling the primary circuit, the power consumption of the power supply is substantially reduced to ultra-low levels during idle operation.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS OF THE INVENTION

The present invention may be described herein in terms of various functional components and various processing steps. It should be appreciated that such functional components may be realized by any number of hardware or structural components configured to perform the specified functions. For example, the present invention may employ various integrated components, such as buffers, current minors, and logic devices comprised of various electrical devices, e.g., resistors, transistors, capacitors, diodes and the like, whose values may be suitably configured for various intended purposes. In addition, the present invention may be practiced in any integrated circuit application. However for purposes of illustration only, exemplary embodiments of the present invention will be described herein in connection with a switching power converter for use with power supply circuits. Further, it should be noted that while various components may be suitably coupled or connected to other components within exemplary circuits, such connections and couplings can be realized by direct connection between components, or by connection through other components and devices located thereinbetween.

Figure 1:
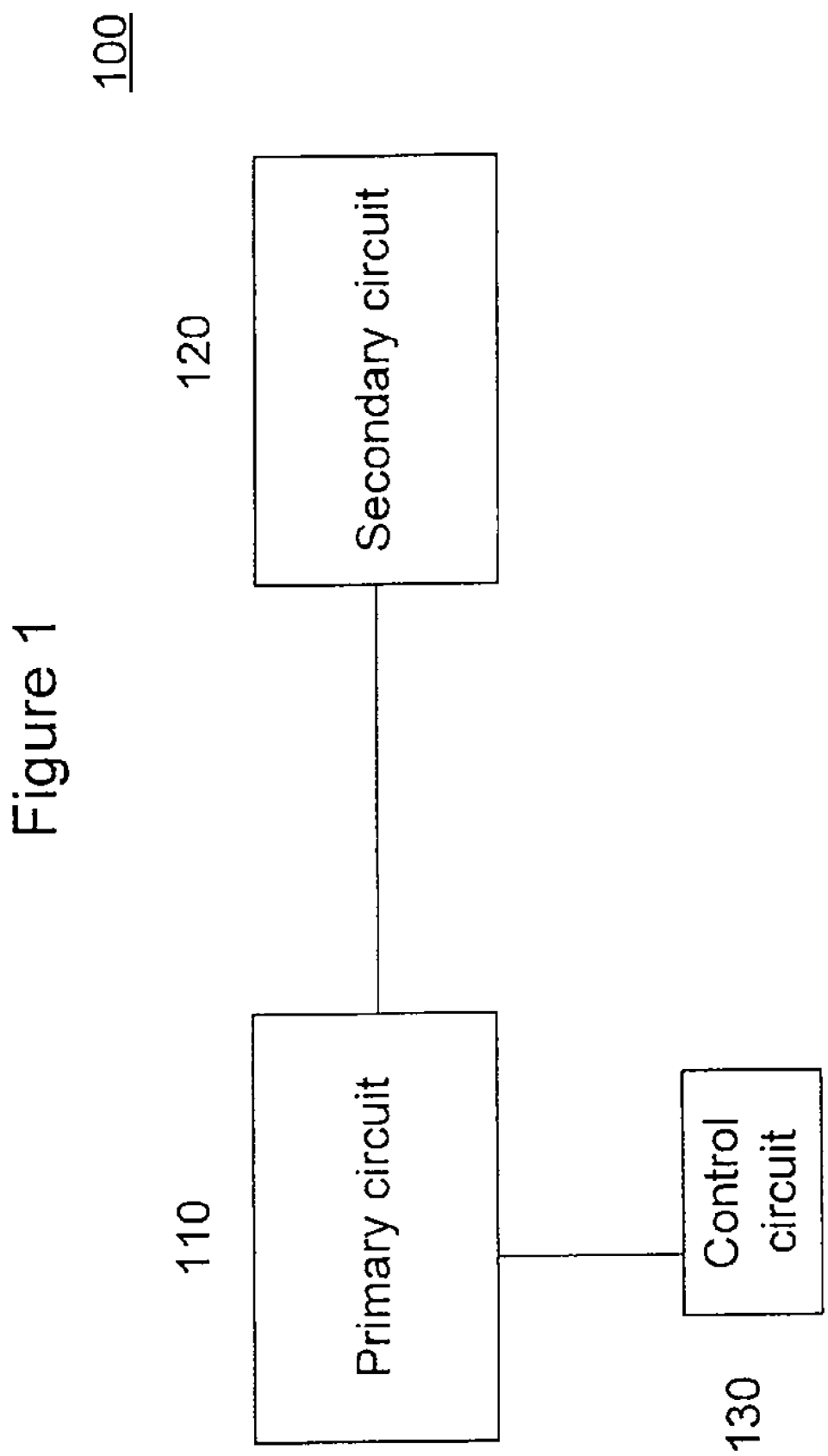
FIG. 1 illustrates a block diagram of an exemplary power supply configured for reducing power consumption during idle mode in accordance with an exemplary embodiment.

In accordance with various aspects of the present invention, a power supply configured for reducing power during idle mode to ultra-low levels, such as about $1/10^{th}$ to $1/1000^{th}$ or less of active power is disclosed. In an exemplary embodiment, and with reference to FIG. 1, an ultra-low idle power supply 100 includes a primary circuit 110, a secondary circuit 120, and a control circuit 130. In an exemplary embodiment, ultra-low idle power supply 100 provides power to an electronic device, such as for example, a notebook computer, mobile phones, Bluetooth headsets, smartphones, MP3 players, and portable GPS systems. In addition, the outside power source is either alternating current (AC) or direct current (DC) and connects with primary circuit 110. Secondary circuit 120 is in communication with primary circuit 110. Control circuit 130 monitors and controls the state of primary circuit 110. While control circuit 130 is illustrated in FIG. 1 as a component connected to primary circuit 110, control circuit 130 can also be integrated within or otherwise considered included within primary circuit 110, as both components are part of the primary side of power supply 100, and the embodiment shown is merely for illustration purposes. In an exemplary embodiment, the behavior and/or characteristics of primary circuit 110 are monitored and/or assessed. If the monitored behavior/characteristics of primary circuit 110 indicate that the electronic device is drawing substantially no power from ultra-low idle power supply 100, control circuit 130 facilitates or controls disengaging or disabling of primary circuit 110. In one embodiment, substantially no power is intended to convey that the output power is in the range of about 0-1% of a typical maximum output load. In an exemplary embodiment, control circuit 130 is configured to control the state of primary circuit 110 by controlling a switching circuit to alter the primary circuit state and change the operation modes of power supply 100, e.g., to disengage or disable input power from primary circuit 110. In an exemplary embodiment, control circuit 130 controls primary circuit 110 to change the modes of ultra-low idle power supply 100 in accordance with the input power level. However, various other conditions such as rate of operation of the primary circuit with other components, current levels and the like can also be observed and monitored.

By substantially disabling or disengaging primary circuit 110, the power consumption of ultra-low idle power supply 100 is reduced. In one embodiment, substantially disabling the primary circuit is configured such that primary circuit 110 switching circuits are static and drawing quiescent current only. In another embodiment, substantially disabling the primary circuit is configured such that switching circuits are no longer switching and that primary circuit 110 capacitors and secondary circuit capacitors 120 are static and charged with no ripple current. In yet another embodiment, substantially disabling the primary circuit is configured such that power is entirely removed from primary circuit 110.

In an exemplary embodiment, ultra-low idle power supply 100 has three modes: active, normal idle, and ultra-low idle. Active mode is the active functioning of ultra-low idle power supply 100 when powering an electronic device. Normal idle mode is when ultra-low power supply is connected to an input power source but not actively powering an electronic device. In an exemplary embodiment, ultra-low idle power supply 100 verifies that the current state is normal idle mode prior to switching to ultra-low idle mode.

During the ultra-low idle mode, primary circuit 110 is substantially disabled or disengaged, which substantially decreases the rate of power consumption compared to during the normal idle mode. Furthermore, in another embodiment, ultra-low idle power supply 100 can also comprise a low duty cycle "wake up" period to alter the idle time from constant idle to long periods of zero power and short periods of idle power.

Figure 2:
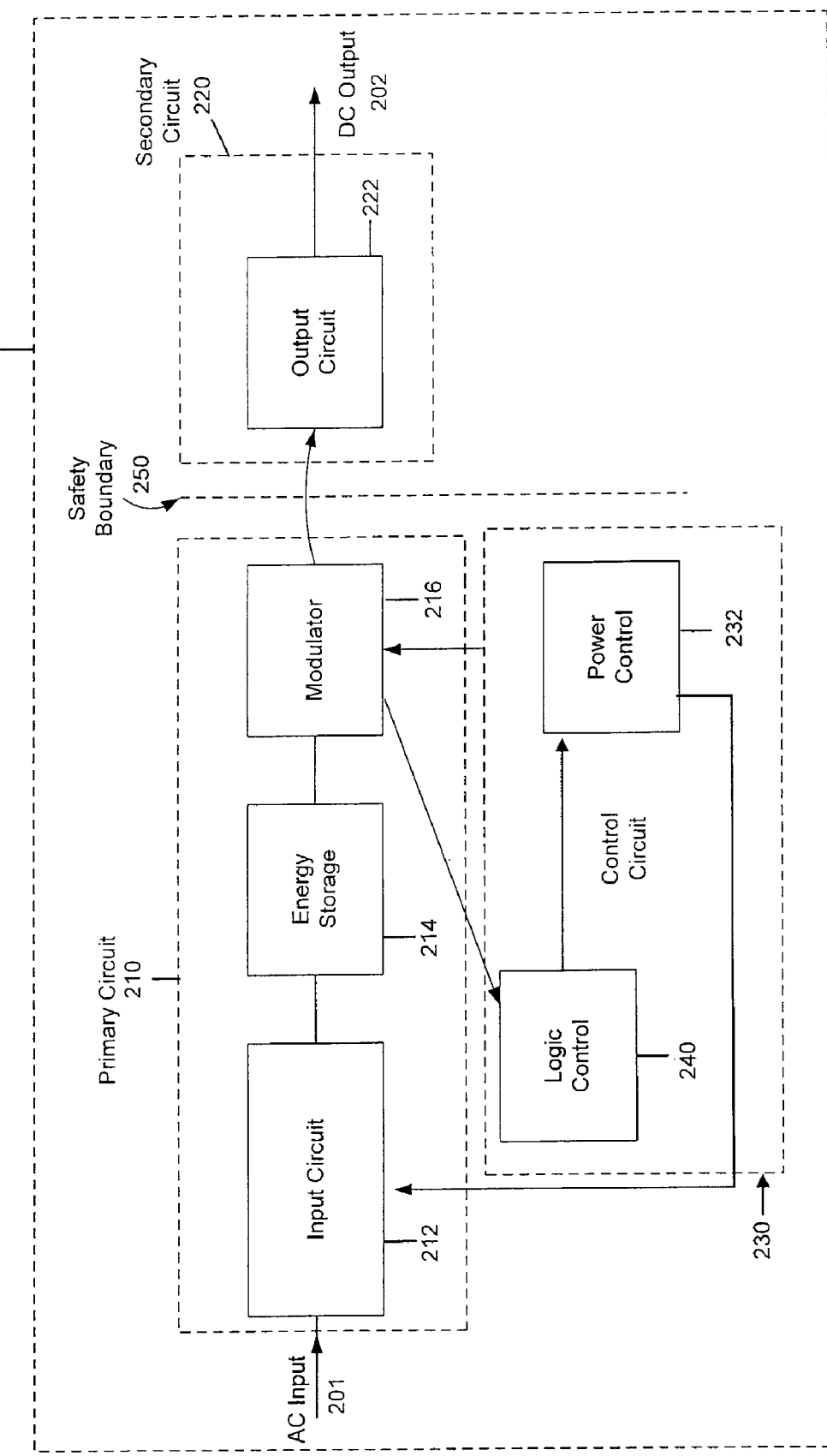
FIG. 2 illustrates another block diagram of an exemplary power supply configured with a primary circuit for reducing power consumption during idle mode in accordance with an exemplary embodiment.

In accordance with an exemplary embodiment, and with reference to FIG. 2, an ultra-low idle power supply 200 includes a primary circuit 210, a secondary circuit 220, and a control circuit 230. A safety boundary 250 separates primary circuit 210 and secondary circuit 220. Ultra-low idle power supply 200 receives a power input 201, which can be either AC or DC, and transmits a power output 202, which can also be either AC or DC, to an electronic device.

In an exemplary embodiment, primary circuit 210 includes an input circuit 212, an energy storage unit 214, and a modulator 216. Input circuit 212 is configured for protecting, filtering and/or rectifying input power to primary circuit 210. In one embodiment, input circuit 212 includes input EMI filters and a rectifier, and can comprise any other devices for protection, filtering and/or rectifying. Energy storage unit 214 is configured for smoothing rectified direct current and for storing energy. Energy storage unit 214 can comprise an energy storage capacitor, or any other energy storage device or circuit. Modulator 216 is configured for driving a dielectric isolation device, such as, for example, a transformer. In an exemplary embodiment, modulator 216 can include a PWM controller and/or a MOSFET.

In accordance with an exemplary embodiment, control circuit 230 monitors the behavior of primary circuit 210 and facilitates control of the mode of ultra-low idle power supply 200 based on at least one of, or a combination of: the power transmitted through primary circuit 210, the rate of operation of primary circuit 210 components, the width of pulses in modulator 216, the ripple current in the storage capacitor contained in energy storage 214, the input current from AC input 201, the temperature of lossy components in primary circuit 210, and/or the current flow through the switch circuits within primary circuit 210. For example, if the output load is at substantially low power for about ten seconds, then control circuit 230 can facilitate changing ultra-low idle power supply 200 to ultra-low idle power mode. In an exemplary embodiment, ultra-low idle power supply 200 mode is changed due to selected criteria, and the criteria can comprise a fixed criterion, a template, and/or a learned criterion.

In accordance with an exemplary embodiment, control circuit 230 comprises a logic control unit 240 and a power control unit 232. Logic control unit 240 is configured to monitor primary circuit 210, e.g., by monitoring operation of modulator 216, and to output a control signal that feeds back information to primary circuit 210. In an exemplary embodiment, logic control unit 240 includes a monitoring and control device. The monitoring and control device may comprise a combinational logic machine, a state machine, and/or a microprocessor. Power control unit 232, which may comprise, for example, a combinational logic machine, a state machine, and/or a microprocessor, controls the operation of primary circuit 210, e.g., by controlling operation of modulator 216. For example, power control unit 232 can receive the control signal from logic control unit 240 and either enables or disables portions of modulator 216, such as by controlling operation of switches $S_2$, $S_3$, and/or $S_4$.

Figure 3:
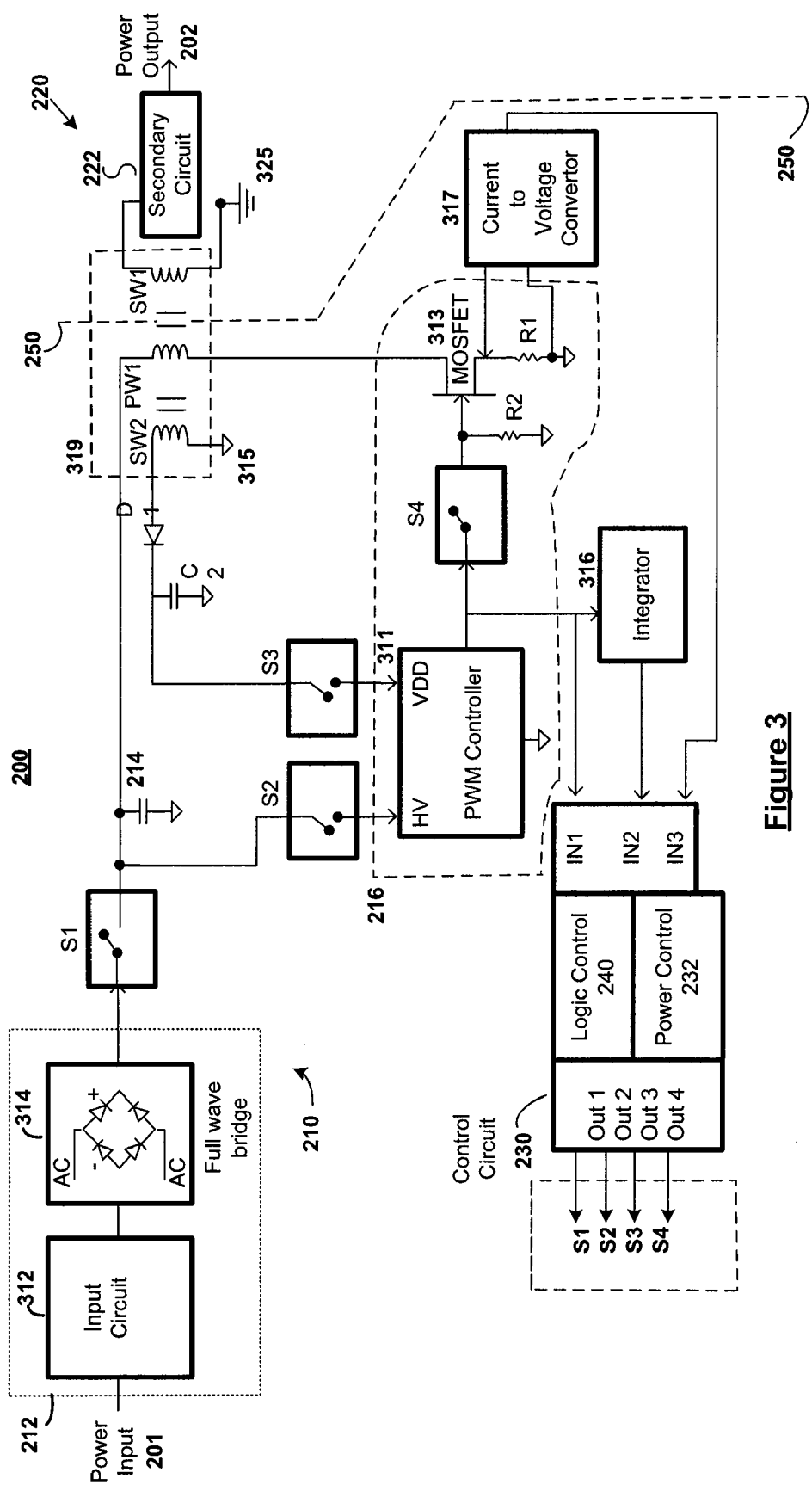
FIG. 3 illustrates a circuit diagram of exemplary power supply configured with a primary circuit for reducing power consumption during idle mode in accordance with an exemplary embodiment.

In an exemplary embodiment, and with reference to FIGS. 2 and 3, primary circuit 210 conveys power to secondary circuit 220 through a transformer 319. Furthermore, primary circuit 210 connects to a first ground 315 and secondary circuit 220 connects to a second ground 325, isolated by safety boundary 250. In addition to comprising a full wave bridge circuit 314, an integrator 316, a current-to-voltage converter 317 having a resistor R1 and/or other components, and energy storage unit 214, primary circuit 210 can also be configured with modulator 216 having a Pulse Width Modulator (PWM) controller 311 and a MOSFET 313.

The components within modulator 216, such as PWM controller 311 and MOSFET 313, serve to chop the input DC from input circuit 212 at a high frequency rate to drive transformer 319 and transfer power from the primary (left side) of transformer 319 to the secondary (right side). The rate of chop or duty cycle is directly proportional to the load on output 202.

In an exemplary embodiment, PWM controller 311 may be monitored by logic control unit 240 for behavior that indicates ultra-low idle power supply 200 should change to ultra-low idle mode. PWM controller 311 comprises a discrete component with on/off states and a modulation rate. The on/off states of PWM controller 311 control the power transmitted to secondary circuit 220. For example, in one embodiment, the rate of pulses going from PWM controller 311 to a transistor switch in modulator 216, such as MOSFET 313, substantially affects the output power delivered at power output 202. In another embodiment, PWM controller 311 may use a variable width pulse train with a fixed rate to control power at power output 202. In yet another embodiment, PWM controller 311 may also use a combination of rate and width to control the power transmitted to secondary circuit 220.

In an exemplary embodiment, when a normal light load condition is detected by PWM controller 311, the rate and pulse width is reduced substantially below normal loaded conditions. In an exemplary embodiment, substantially below normal is defined to be a pulse rate of less than about 1 kilohertz during conditions of loads in the range of about 1-90 watts. In another embodiment, substantially below normal is defined to be a pulse width of microseconds out of a period of milliseconds during idle conditions. Such changes in the output rate of PWM controller 311 can be sampled or detected at input IN1. For example, a DRV output of PWM controller 311 can be sampled by logic control unit 240 and the rate (frequency) of the drive pulses can be measured. At low power levels, PWM controller 311 will be operating in a low pulse rate mode often called "cycle skipping". Cycle skipping usually occurs when the load is below about 20 watts at power output 202, and the pulse rate will vary from a few hundred pulses/second to a few thousand as the load varies from near zero to about 20 watts. Furthermore, this transition to and operating in the lowered PWM rate and reduced width mode can be detected by logic control unit 240 monitoring the rate of pulses from PWM controller 311 observed from the output of integrator 316 at an input IN2 (wherein the pulse rate of a DRV output of PWM controller 311 can be integrated by integrator 316 to provide a DC voltage proportional to the load at 202), and/or current-to-voltage converter 317 at an input IN3 (wherein the current in MOSFET switch 313 is converted to a voltage by resistor R1, and the resulting current varies in proportion to the load current at power output 202). In one embodiment, reduced width may also be described as reduced duty cycle, where the duty cycle refers to the ratio of the time the PWM output pulse is active, or high, or driving a switching element to the rate or period of the PWM signal.

Once detected, logic control unit 240 may further reduce the power by suspending switching in modulator 216 and otherwise within primary circuit 210. In an exemplary embodiment, the switching is suspended by logic control unit 240 sending signals to switches $S_2$, $S_3$, and/or $S_4$ to disconnect PWM controller 311 from its power inputs, HV (high voltage input) and $V_{DD}$ (controller operating voltage), and its drive to MOSFET 313.

In accordance with an exemplary embodiment, the power from primary circuit 210 transfers across safety boundary 250, via transformer 319, to secondary circuit 220. Safety boundary 250 creates no direct contact between the primary and secondary circuits to prevent unwanted transfer of electricity. In an exemplary embodiment, safety boundary 250 includes a dielectric isolation component. Dielectric isolation component may comprise a transformer, a capacitive coupling, or an opto-coupler. Furthermore, dielectric isolation component may be any component suitable to meet the criteria of safety requirement Underwriters Laboratory 60950. In accordance with safety regulations, safety boundary 250 is present in embodiments comprising AC into primary circuit 210 and transmitting DC power from the secondary circuit. In additional embodiments, the safety boundary may be present but is not required, or may not be present altogether. For example, there may not be a safety boundary in an embodiment with DC input and DC output.

In an exemplary embodiment, transformer 319 comprises a primary winding PW1, a secondary winding $SW_1$, and a secondary winding $SW_2$. Secondary winding $SW_2$ provides operating power to PWM controller 311 through switch $S_3$, while secondary winding $SW_1$ provides the output voltage for secondary circuit 220. Diode $D_1$ and capacitor $C_2$ within primary circuit 210 serve to rectify and smooth the AC output of secondary winding $SW_2$ so the input $V_{DD}$ to PWM controller 311 is direct current (DC). In an exemplary embodiment, PWM controller 311 includes a high-voltage (HV) input in communication with energy storage capacitor 214 and controlled by switch $S_2$. The HV input is used to initiate the function of PWM controller 311 at power on, with the $V_{DD}$ input providing normal operating voltage once the PWM controller 311 is driving MOSFET 313 and primary winding $PW_1$. In an exemplary embodiment, at power "on" state, switches $S_1$-$S_4$ are normally closed so PWM controller 311 can power up and function normally.

In an exemplary embodiment, secondary circuit 220 further includes an output circuit 222. Output circuit 222 is configured to convert the power from primary circuit 210 into a desired power load at power output 202 for an electronic device. In an exemplary embodiment, output circuit 222 includes a filter capacitor. In another embodiment, where ultra-low idle power supply 200 receives AC power and transmits DC power, output circuit 222 may include at least one rectifier.

Control circuit 230 is configured to control the state of primary circuit 210 by controlling switches $S_1$-$S_4$ to control modulator 216. Switches can comprise FET-type transistor switches, or can comprise relays, such as solid state or Triac or latching type relays, or any other switching device or mechanism suitable for power supplies. In accordance with an exemplary embodiment, control circuit 230 uses power control unit 232 to control the operation of modulator 216 through switches $S_2$-$S_4$. Power control unit 232 receives the control signal from logic control unit 240 and either enables or disables portions of switch element 216 by controlling switches $S_2$, $S_3$, and/or $S_4$. The enabling or disabling of switch element 216 is dictated by a power control signal communicated from power control unit 232. The power control signal has at least two states; normal idle and ultra-low idle. In addition, in an exemplary embodiment, control circuit 230 retains its present state in memory. In one embodiment, the memory is implemented using a transistor latch. Furthermore, in an exemplary embodiment, the default unprogrammed state of control circuit 230 is normal idle.

In an exemplary embodiment, selection of the current mode is based on the historic rate of PWM controller 311. This historic rate may be determined by logic control unit 240 monitoring input $IN_1$ from the output of PWM controller 311. A template can be determined based upon the past rate of PWM controller 311 and used to determine which mode the ultra-low idle power supply should be operating. For example, the template can determine that once PWM controller 311 is in idle mode for more than 15 minutes, this usage can indicate the output device will not require an active power supply for a long duration of time and the ultra-low idle power supply should switch to the ultra-low idle mode.

In one embodiment, ultra-low power consumption is less than about 0.5 Watts. In another embodiment, ultra-low power consumption is about $\frac{1}{10}^{th}$ to $\frac{1}{1000}^{th}$ or less of the active state power. In one embodiment, for example, the power supply consumption during normal idle mode is about 300 mW, and the power consumption during ultra-low idle mode is between about 0 mW and about 300 mW.

Such an ultra-low idle power supply circuit can be useful in various applications. For example, an ultra-low idle power supply can decrease wasted power consumption when used to power electronic devices such as a laptop, mobile phones, Bluetooth headsets, smartphones, MP3 players, video game systems, and portable GPS systems. In an exemplary embodiment, ultra-low idle power supply 200 can decrease wasted power consumption on an electronic device using an AC off-line switcher.

Various other features, devices and functions can be included within power supply 200 to facilitate improvement operation and/or to provide feedback information. For example, in an exemplary embodiment, although not illustrated in FIG. 2 or 3, ultra-low idle power supply 200 can include a physical mechanical standby switch located at either the connection tip or at the body of the power supply. The standby switch may be used to manually change the mode of ultra-low idle power supply 200 from active mode or normal idle mode to the ultra-low idle power mode. In addition, in an exemplary embodiment, ultra-low idle power supply 200 includes at least one illuminated indicator to show the mode of the power supply. In another embodiment, ultra-low idle power supply 200 includes a device to indicate statistics relating to power consumption. For example, the device may be a gauge, a display such as LCD or LED, and the statistics may include watts saved, power levels, efficiency of the power supply, and the like. In another embodiment, logic control unit 240 monitors ambient light conditions and determines whether it is dark. In accordance with an exemplary method of operation, and with reference to FIGS. 2 and 3, when power supply 200 is first connected to power input 201, power supply 200 functions normally and responds to load conditions by supplying output power to the electronic output device. Control circuit 230 initiates in the normal idle mode, while logic control unit 240 monitors the behavior of modulator 216 through inputs $IN_1$-$IN_3$, and determines whether the power output is lightly loaded or not loaded over some period of time.

In an exemplary embodiment, power supply states are changed from normal idle to ultra-low idle when the power output load is below a predetermined threshold. The predetermined threshold may be fixed, dynamic, and/or learned. In one embodiment, a light load is any power output load falling below the predetermined threshold.

If light activity, or no activity, is detected at modulator 216, logic control unit 240 will send a change/control signal to power control unit 232. Once the signal is received, power control unit 232 will change states from normal idle to ultra-low idle. Furthermore, power control unit 232 communicates another signal to switches $S_2$, $S_3$, and $S_4$, thereby disabling modulator 216 by opening switches $S_2$, $S_3$, and $S_4$. Once modulator 216 is disabled, the power wasted in the switching elements is eliminated and only very small leakage currents from energy storage unit 214 are lost. As a result, the circuits that consume power are disconnected and power supply 200 goes "dead", and wherein during the disconnect time the power consumed by components connected to the AC input is greatly minimized.

In an exemplary method of operation, if logic control unit 240 signals power control unit 232 to close switches $S_2$, $S_3$, and $S_4$, logic control unit 240 then monitors the behavior of modulator 216. If the switching frequency or rate increases within modulator 216, thereby indicating a demand for load at power output 202, logic control unit 240 signals power control unit 232 to change states back to normal idle mode. In an exemplary embodiment, ultra-low idle power supply 200 remains in normal idle mode until the load conditions indicate a reduced or "zero" power state. In another exemplary embodiment, logic control unit 240 may include an internal timer to periodically alter the ultra-low idle power supply state back to normal idle, so that the secondary circuit components can maintain power.

Figure 4:
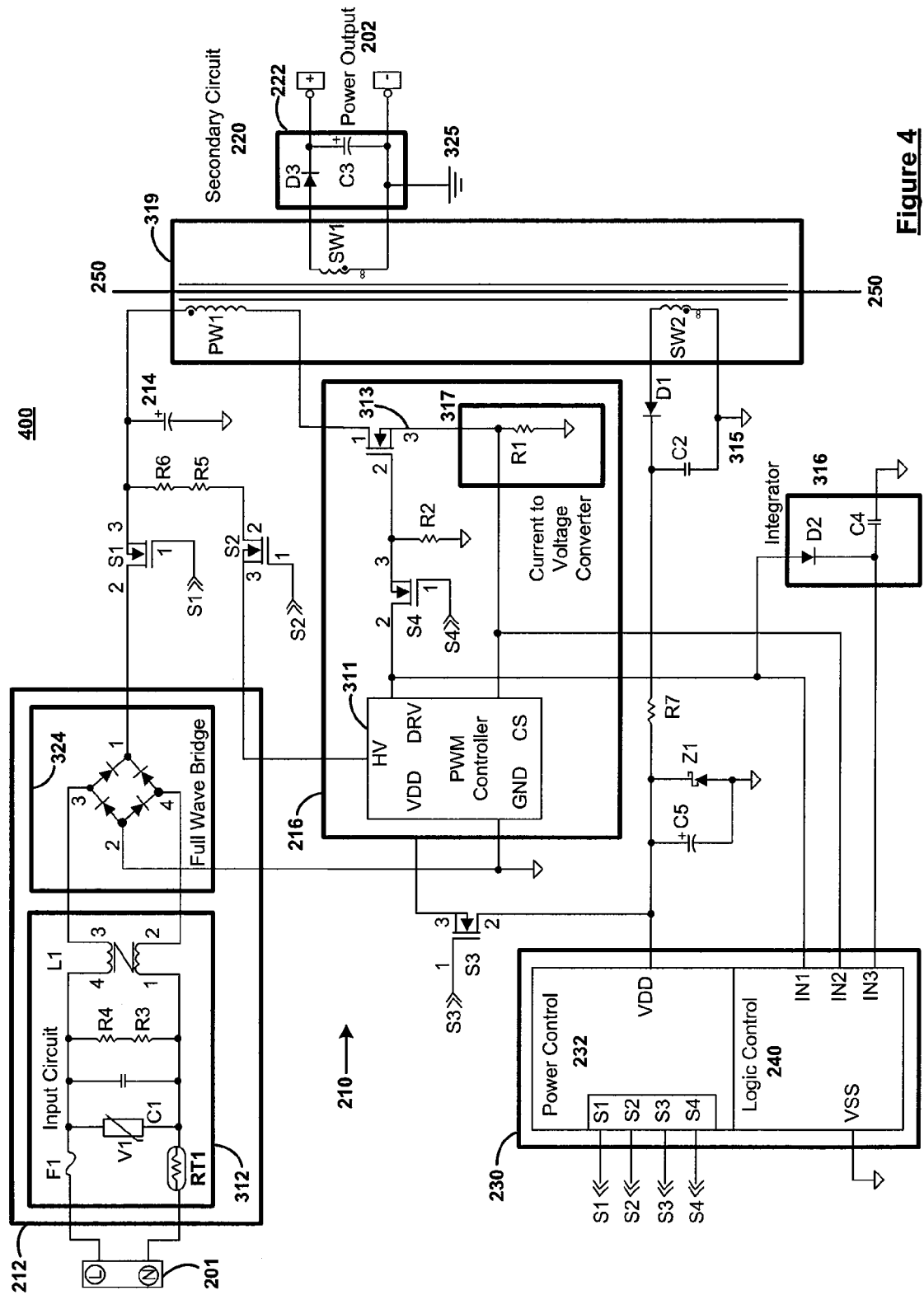
FIG. 4 illustrates a circuit/schematic diagram of exemplary power supply configured with a primary circuit for reducing power consumption during idle mode in accordance with an exemplary embodiment.

In an exemplary embodiment, energy storage unit 214 is connected to power input 201 through switch $S_1$ periodically even when ultra-low idle power supply 200 is in the ultra-low idle mode. This results in a rapid shift from ultra-low idle mode to normal idle mode, or active mode, without the delay of recharging energy storage unit 214. This occurs despite switching elements 216 being disabled during ultra-low idle mode. With reference to FIG. 4, additional details and operational features can be further disclosed in connection with another exemplary embodiment of a power supply 400. In accordance with this exemplary embodiment, input circuit 212 comprises an input circuit 312 and a rectifier 314. Input circuit 312 comprises an RC filtering circuit for AC input power at input terminals 210 and can be structured or rearranged in various manners for providing surge protection and/or filtering functions. Rectifier 314 comprises a full-wave bridge rectifier circuit, but likewise can comprise various other rectifier configurations. In the exemplary embodiment, switches S1-S4 comprise FET-type switches, but can also be suitably replaced with various other switching devices and components, such as relays. Switches S1-S4 are configured to disconnect power drains from their sources. Integrator 316 comprises diode D2 and capacitor C4 for use by logic control unit 240. To provide conditioned power for PWM controller 311 and power control 232, primary circuit 210 further comprises a circuit comprising diode D1, capacitor C2, resistor R7, zener-diode Z1 and capacitor C5. Secondary circuit 220 comprises diode D3 and capacitor C3 which serve to rectify and filter the pulsating output of secondary winding SW1 for use by power output 202.

During start-up of power supply 400, all FET switches S1-S4 are in the "closed" condition, allowing power supply 400 to start up normally. Switches S1-S4 may be of the N or P channel variety as required, although N channel is shown. The DC output of input circuit 212 passes through FET switch 51 and charges energy storage unit 214. As the voltage is rising on energy storage unit 214, a small amount of current is "picked off" by resistors R4 and R5 through FET switch S2 and fed to the HV input of PWM controller 311. This HV (high voltage) input current begins to start up circuits in PWM controller 311, and on output DRV (Drive) of PWM controller short pulses begin to appear. These pulses travel through FET switch S4 to the gate of MOSFET 313. This gate drive to MOSFET 313 causes MOSFET 313 to switch on and off, wherein this switching drives the PW1 primary winding of transformer 319. Transformer secondary winding SW2 receives the driving pulses through the transformer coupling and provides a pulsating output voltage to diode D1. Diode D1 and capacitor C2 rectify and filter the pulses and produce an unregulated DC voltage to resistor R7. Resistor R7 current limits this DC voltage before it reaches zener diode Z1 and bulk capacitor C5. Capacitor C5 is a large value capacitor that serves to keep power control 232 powered when the rest of power supply 400 is shut off by control circuit 230. The voltage on zener diode Z1 and capacitor C5 is a regulated and smoothed DC voltage that is used by power control 232 and is also fed to PWM controller 311 through FET switch S3 to input VDD (main power input) of PWM controller 311. Once PWM controller 311 senses a stable input on its VDD input, PWM controller 311 will widen the pulse width on the DRV output and increase the frequency of the pulses. This start-up process causes transformer secondary SW1 to receive the wider high frequency pulses and produce a DC voltage output from D3 and C3 at power output 202. The voltage level at 202 is fed back to PWM controller 311 (feedback path not shown for clarity) by methods known to one in the field. This feedback process completes the regulation loop and at this point the power supply is operating normally.

As to load level detection, during normal operation when power levels are in the about 20 watts to maximum output power range, PWM controller 311 will typically produce output pulses of varying width up to about a 50% duty cycle and at a fixed frequency of about 60 KHz (60,000 pulses per second). As the load at power output 202 varies over this output range, the feedback in power supply 400 will cause PWM controller 311 to adjust the output pulses at the DRV output to regulate the output voltage at 202. When the output load is between about 20 watts down to virtually no load, the output pulses of PWM controller 311 will be of shorter duration and less frequent in proportion to the load at power output 202. Logic control unit 240 will use this pulse information received at inputs IN1-IN3 to determine the approximate load at power output 202, and will cause power control unit 232 to change the function of modulator 216 based on the load at power output 202.

When logic control unit 240 has monitored inputs IN1-IN3 and has determined that a low load or zero load condition exists on power output 202, logic control unit 240 will cause power control unit 232 to send signals to operate switches S1-S4 to selectively disconnect circuits on the primary side to reduce idle power levels. For example, control circuit 230 will first open FET switches S3 and S2, removing all power to PWM controller 311. Second, FET switch S4 can be opened to remove any residual drive to the gate of MOSFET 313. This prevents MOSFET 313 from turning on due to leakage currents from the DRV output of PWM controller 311. Lastly, FET switch S1 is opened to remove the rectified DC coming to energy storage unit 214 from input circuit 212. At high input voltages, the leakage current required to keep energy storage unit 214 fully charged is significant.

Once modulator 216 and other primary side circuits are isolated by the switches S1-S4, only logic control unit 240 and power control unit 232 are powered by virtue of the charge on bulk capacitor C5. In an exemplary embodiment, capacitor C5 will be of a value large enough to power logic control unit 240 and power control unit 232 for several tens of minutes. During the time the other circuits are dead, i.e., without power, logic control unit 240 and power control unit 232 are in a low power sleep mode that draws only nanoamperes from capacitor C5. Periodically logic control unit 240 can wake up and instruct 232 to close FET switch Si briefly to keep energy storage unit 214 charged. This precharge of 214 will allow the system to start up quickly when operation is restored.

To determine when to turn back on or power up, logic control unit 240 senses the voltage at input VDD of power control unit 232 and will re-energize power supply 400 when either a) the voltage on input VDD of power control unit 232 is reaching a critically low level and must be recharged, or b) after a period of minutes has elapsed. Power control unit 232 will close all four switches S1-S4 simultaneously to re-establish the initial start up conditions of the system at power on. This start up process will be faster than a "cold" power-off start-up because energy storage unit 214 has been kept charged. As power supply 400 starts up, bulk capacitor CS will be re-charged to continue the supply of voltage to input VDD of power control unit 232.

Once power supply 400 is up and running as measured by logic control unit 240 from the signals at inputs IN1-IN3, logic control unit 240 will again make measurements and determine power levels. If during the off time the load at power output 202 has increased, then logic control unit 240 will allow power supply 400 to run normally. If the power output 202 load is continuing to be low or near zero, logic control unit 240 will again signal the FET switches S1-S4 with power control unit 232 to set power supply 400 into the low power state.

The present invention has been described above with reference to various exemplary embodiments. However, those skilled in the art will recognize that changes and modifications may be made to the exemplary embodiments without departing from the scope of the present invention. For example, the various exemplary embodiments can be implemented with other types of power supply circuits in addition to the circuits illustrated above. These alternatives can be suitably selected depending upon the particular application or in consideration of any number of factors associated with the operation of the system. Moreover, these and other changes or modifications are intended to be included within the scope of the present invention, as expressed in the following claims.

The invention claimed is:

1. A primary side circuit configured to facilitate an ultra-low idle power mode in a power supply, said primary side circuit comprising:
    a modulator configured for modulating input power at a high frequency rate to transfer power from a primary side of a transformer to a secondary side of the transformer; and
    wherein said primary side circuit is in communication with a control circuit on a primary side of said power supply, and wherein said control circuit is configured to monitor at least one of a duty cycle or a switching rate of said modulator and to control said primary side circuit such that said primary side circuit is substantially disabled in response to said control circuit determining that substantially no load exists.

2. The primary side circuit of claim 1, wherein said control circuit comprises a logic control unit configured for monitoring said modulator and a power control unit configured for control of said primary side circuit.

3. The primary side circuit of claim 2, whereby said power control unit disables said modulator by opening at least one switch device coupled between said power control unit and said modulator.

4. The primary side circuit of claim 1, wherein said modulator comprises a PWM controller.

5. The primary side circuit of claim 2, wherein said logic control unit comprises at least one input coupled to said modulator to monitor said at least one of said duty cycle or said switching rate of said modulator.

6. The primary side circuit of claim 5, wherein said at least one input coupled to said modulator monitors at least one of an output pulse rate directly from a PWM controller within said modulator, an output from an integrator coupled to said PWM controller, and an output from a current-to-voltage converter coupled to said PWM controller.

7. A method for facilitating ultra-low power consumption in a power supply comprising:
    monitoring, using a control circuit in communication with a primary circuit on a primary side of a power supply, at least one of a duty cycle or a switching rate of said primary circuit of said power supply and determining if a substantially no load condition exists; and
    substantially disabling, using said control circuit, said primary circuit of said power supply in response to said substantially no load condition being detected.

8. The method according to claim 7, said method further comprising enabling said power supply in response to said control circuit determining a power load exists.

9. The method of claim 8, wherein said enabling said power supply occurs in response to at least one of a duty cycle or a switching rate of said primary circuit increasing above a threshold level.

10. The method of claim 7, wherein said monitoring comprises having said control circuit monitor the activity of a modulator to determine whether said substantially no load condition exists.

11. The method of claim 10, wherein said control circuit monitors at least one of an output pulse rate or a duty cycle directly from a PWM controller within said modulator.

12. The method of claim 10, wherein said control circuit monitors an output from a current-to-voltage converter coupled to a PWM controller within said modulator or an output from an integrator coupled to the PWM controller.

13. The method of claim 7, wherein said power supply is substantially disabled for an indeterminate period of time.

14. A circuit for use in a power converter to facilitate ultra-low power consumption during an idle mode, said circuit comprising:
    a control circuit configured to monitor at least one of a duty cycle or a switching rate within a primary circuit of the power converter to detect the idle power mode, wherein said control circuit controls the primary circuit such that the primary circuit is substantially disabled in response to the detection of the idle power mode.

15. The circuit of claim 14, wherein said control circuit comprises a power control unit configured for control of the primary circuit.

16. The circuit of claim 15, whereby said power control unit disables a modulator of the primary circuit by opening at least one switch device coupled between said power control unit and the modulator.

* * * * *